3,050,615
TUBE WELDING METHOD AND APPARATUS
Sterling A. Oakley, Lincolnwood, Ill., assignor to S. A. Oakley, Inc., Skokie, Ill., a corporation of Illinois
Filed Sept. 11, 1959, Ser. No. 839,416
9 Claims. (Cl. 219—60)

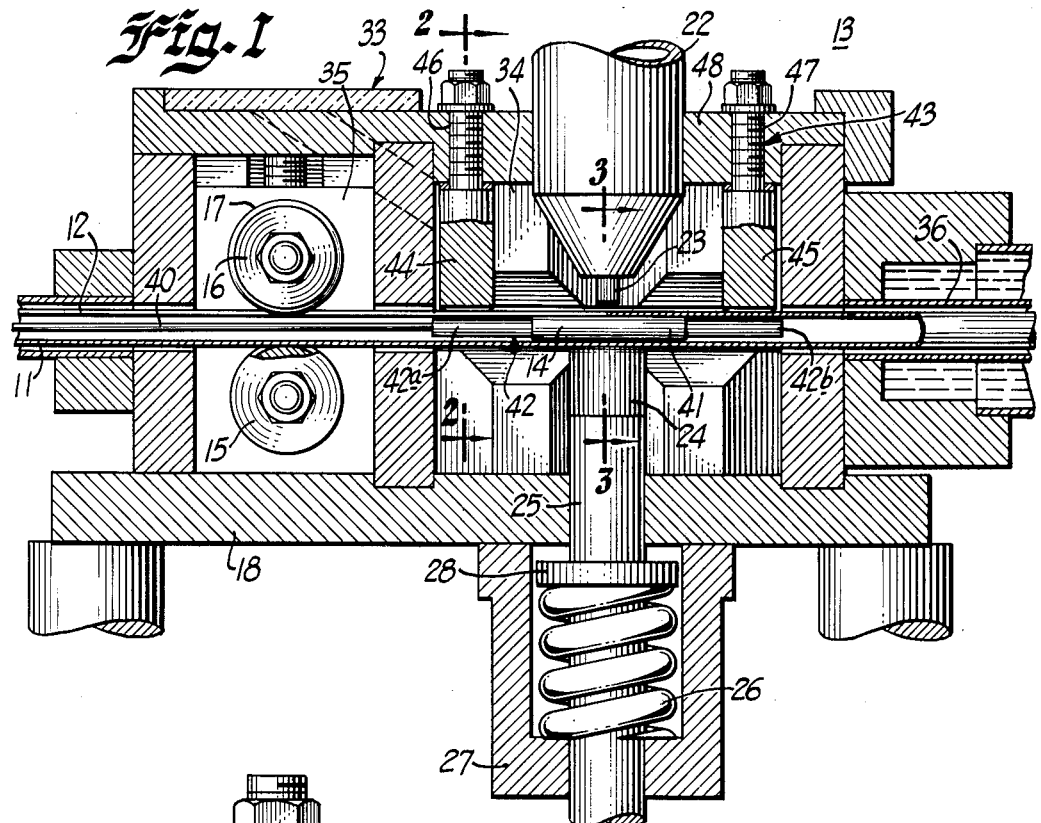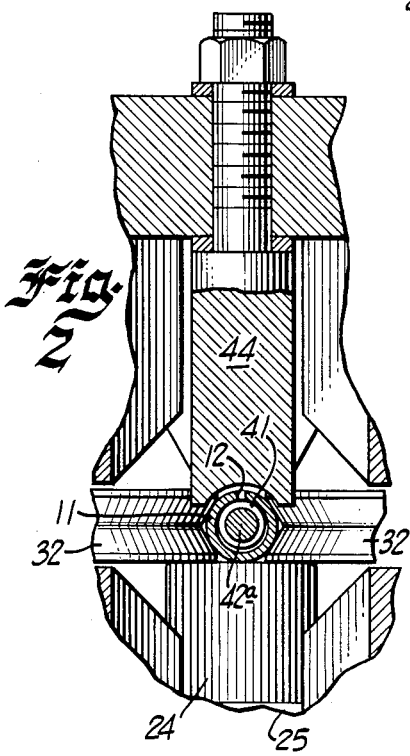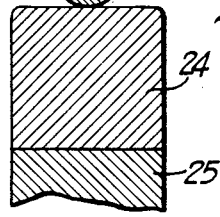
INVENTOR.
STERLING A. OAKLEY
BY Mason, Kolehmainen, Rathburn and Wyss
ATTORNEYS

United States Patent Office 3,050,615
Patented Aug. 21, 1962

The present invention relates to a tube welding apparatus and method of welding, and more particularly to a method and apparatus useful in connection with welding the seams in metal tubing.

Welded tubing, which is extensively used today for many purposes, such as, for example, airplane struts, fluid carrying conduits and sheaths for heating elements, is constructed of a rectangular sheet of metal which is formed into a cylinder and welded along the abutting edges thereof to form a longitudinally welded seam. Although the present invention finds application in the forming of metal tubing, particularly steel, of all types, for convenience in explaining the invention and to facilitate an understanding thereof is is described in connection with the manufacture of sheaths for heating elements of the type commonly used in electric ranges, electric flatirons, electric cooking vessels, electric dryers and the like. Sheathed heating elements of this type comprise an outer metal sheath which houses therein a resistance element such as a helical resistance wire. In order to suppport this resistance wire concentrically within the sheath and in spaced insulated relationship therewith, the sheath is filled with a compacted mass of material which is a good electrical insulator but at the same time is a good heat conductor, so that the heat from the resistance element is readily transmitted to the sheath. A common material for this purpose is fused magnesium oxide. It will be apparent that the sheath employed in connection with such sheathed heating elements must be formed of a material which will withstand high temperatures and which will not deteriorate when repeatedly subjected to such temperatures over long periods of time. The sheaths may be formed from a high nickel chromium alloy.

Such sheaths are commonly formed from flat strip material formed by suitable forming rollers into the desired tubular shape. This results in tubing with an open seam, and it is necessary to close the seam in the tubing thus formed, which is commonly done by a seam-welding process. One welding machine satisfactory for this purpose employs a gas-shielded arc and, for example, may comprise the apparatus disclosed and claimed in my prior U.S. Letters Patent 2,788,430, granted April 9, 1957.

The particular construction of the welding process employed with the welding machine of the above patent is not material except that it generally employs an inert arc-shielded gas such as is disclosed and claimed in U.S. Letters Patent 2,468,808, granted May 3, 1959, to Drake, and a particular welding process may comprise that disclosed in U.S. Letters Patent 2,376,265, granted May 15, 1945, to Meredith.

However, difficulties have heretofore been experienced in the welding of tubing, in that a small bead of the weld forms on the inside of the seam of a welded tube. Such a bead is particularly objectionable in, for example, an electric sheathing tube where the electrical resistivity of the heating unit carried within the tube, and the heat conductivity of the tube itself may vary with variations in the diameter of the tube caused by such a welding bead. While attempts have been made to eliminate the portion of the bead extending inside the tube such attempts have not been entirely successful and difficulties still exist occasioned by the formation of the bead. One such attempt to eliminate the inside bead consists in welding the tube upside down; that is with the seam down. However such welding process has not been entirely successful since capillary action pulls the molten welding metal back up into the tube to form a bead.

Accordingly it is an object of this invention to provide a new and improved welding apparatus.

A further object of this invention is to provide a new and improved welding apparatus for welding the seams of tubing.

A further object of this invention is to provide a new and improved welding apparatus which substantially eliminates the formation of a welding bead on the inside of the seam of the welded tube.

A further object of this invention is to provide a new and improved method of welding the seams of welded tubing.

Briefly stated the present invention is directed to a welding apparatus and method useful in closing the seam of seamed tubing for defining the sheaths of sheathed heating elements and specifically comprises means for preventing an internal bead in a weld of seamed tubing. Such means includes a weld back-up member of smaller diameter than the inside diameter of the tube positioned within the tube and biased or held against the inner side of the seam being welded by magnetic force. According to one feature of the invention the back-up member is restrained from relative movement with respect to the welding machine while the tube is moved longitudinally through the welding machine; the back-up member is held stationary by a "swimmer" in the form of an elongated wirelike member having one end supported on a stationary part and entering the tubing at a point during the forming operation when the tube is sufficiently open to permit ready insertion of the swimmer. The back-up member is biased against the seam by magnetic force and effectively forms a back-up for the weld thereby eliminating the bead from forming.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawing, in which:

FIG. 1 is an elevational view, in section, illustrating the improved welding apparatus according to the instant invention;

FIG. 2 is a sectional view of the apparatus of FIG. 1 taken along plane 2—2 and illustrating certain features of the welding apparatus;

FIG. 3 is a sectional view, taken along plane 3—3 of FIG. 1, illustrating the back-up member according to the instant invention;

FIG. 4 is a cross section of a tube welded by conventional methods; and

FIG. 5 is a cross section of a tube welded by the instant apparatus and according to the present method.

Referring now to the drawings, there is illustrated the improved seam welding apparatus for seamed tubing wherein the weld is backed up so as to wipe away the inner welding bead according to the instant invention. The present apparatus is particularly useful in a continuous butt-welding process for welding the seam of a seamed tubing for the sheaths of sheathed heating elements, and preferably this tubing is formed from continuous strip material just prior to welding the seam thereon, as more fully described in my aforementioned prior patent. A flat strip of the desired material passes through a succession of forming rollers (not shown) and is successively converted, first to a U-shaped form, and then to a substantially closed tubular form 11, with a seam 12 defined between the edges of the strip which have been brought close to abutting relationship.

In accordance with the present invention, the continuous tubing 11, with the open seam 12, passes through the improved welding apparatus, which includes a known seam welding machine shown generally at 13 for continuously butt-welding the seam, and having incorporated therein a weld back-up member 14 according to the instant invention. The seam welding machine may be of the type described and claimed in my aforementioned prior patent and therefore needs no description in detail herein. However, briefly, the seam welding machine 13 includes means for passing the tube 11 through the machine 13, and includes guide means comprising a slightly concave tube contacting roller 15 and a second tube contacting roller 16 having a knife edge 17 registering with the open seam 12 to maintain the tube 11 and open seam 12 in proper aligned position with the welding machine 13; guide means may also be furnished on the other (right) side of the machine to thereby securely hold the tube 11 in the desired position. The rollers 15 and 16 are rotatably secured to a stationary support member 18 so that the tube 11 passes freely between them.

For the purpose of welding the seam, a welding torch 22 is supported from the stationary support member 18 and, as shown, is spaced vertically above the open seam 12 of the tube 11. The welding torch 22 contains an electric welding rod 23, means for conducting the welding rod 23 to a source of electric welding current (not shown) and a conduit for supplying an inert shielding gas around the rod. To complete the electric welding circuit from the rod through the tube 12, an electrode 24 is biased against the tube 11 by means of electrically conducting rod 25 and spring 26 compressed between a U-shaped extension 27 of support member 18 and a collar 28 fixedly secured to the conducting rod 25. Upon the striking of an arc, current will arc from the welding rod 23 to the tube 11 in the vicinity of the open seam thereof and will then flow through the tube 11 to electrode 24, rod 25, and be returned to the source of welding current. In order to hold the confronting edges of the open seam 12 in proper closely spaced relation, a plurality of pincer rollers 32 (FIG. 2) exerts pressure against the tube 11 to hold the proper seam spacing. To cool the tube 11 after the welding is completed, the tube may pass through a water-cooled jacket 36. In accordance with my aforementioned Letters Patent, the welding machine 13 may include a gas-saving welding box 33, including a welding chamber 34 and an entrance chamber 35, the purpose of which is more fully described in my aforementioned Letters Patent and which, briefly, is intended to reduce the amount of shielding gas employed in the welding operation.

According to the present invention, the weld back-up member 14 is located within the tube 11 coinciding longitudinally with the portion of the tube being welded. To this end, the back-up member 14 is restrained from relative longitudinal movement with respect to the welding machine 13 and is held in proper longitudinal position through a swimmer or wirelike member 40, one end of which is secured to the back-up member 14 and the other end of which is secured to a stationary portion (not shown) of the welding machine 13. The back-up member 14 includes a back-up portion 41 of hollow cylindrical shape and slightly smaller in diameter than the inside diameter of the tube 11 in order to provide a free sliding fit therewith, and formed of heat resistant material such as tungsten or molybdenum; the back-up member 14 also includes a portion or shaft 42 of smaller diameter than the back-up portion 41 and extends concentrically thereto having end portions 42a and 42b extending from the respective ends of the back-up portion 41. The back-up portion 41 is secured to the shaft 42 as by, for example, forming a press fit thereon. The shaft 42 is formed of magnetically attractable material such as soft iron.

For the purpose of biasing the back-up member 14 against the seam 12 during welding, a magnet 43 having magnetic poles 44 and 45, shown as a permanent magnet, is located closely to, but externally of, the tube 11 above the end shafts 42a and 42b respectively. The magnetic poles 44 and 45 are vertically adjustable with respect to the tube 11 by means of a pair of adjusting screws shown somewhat schematically as 46 and 47 respectively and which are formed of soft iron. The adjusting screws 46 and 47 extend through a soft iron member 48 which may, if desired, be one of the walls of the welding box 33. In this way, the magnet 43 is formed of the magnet poles 44 and 45, the adjusting screws 46 and 47, and the soft iron member 48; a magnetic circuit includes the magnet 43 and the back-up member 14 including the magnetically attractable shaft 42, thereby the back-up member 14 is biased or pulled upwardly against the seam 12 of the tube 11 due to the magnetic attraction thereof by the magnet 43, the back-up member 14 otherwise floating within the tube 11.

Having thus described the improved welding apparatus, its mode of operation will now be described. The tube 11 having the open seam 12 is passed through the welding machine 13, the seam 12 thereof being welded by the arc formed between the electrode 23 to the tube 11. The back-up member 14 floats in the tube 11 under the arc, being held longitudinally in place in the tube by the swimmer 40 which secures the back-up member 14 in a stationary position with respect to the longitudinal axis of the tube and its machine, and the back-up member 14 is biased upwardly to back up the welding of the seam 12 by the magnetic force exerted upon it by the magnet 43, as best illustrated in FIG. 3.

A conventional seam weld without the applicant's back-up member 14 is illustrated in FIG. 4. A tube 111 had a seam 112 which was welded in a conventional manner; the weld comprises a central portion 150, an outside bead 151, and an inside bead 152. The tube 11 formed by the applicant's improved welding apparatus had the seam 12 welded to form a weld including a central portion 50 and an outside bead 51. As can be readily appreciated, the improved welding apparatus according to the instant invention leaves no inside bead along the seam 12 of the tube 11.

The instant invention is also directed to an improved method of closing a seam in seamed tubing. The seam 12 of the tube 11 is welded by moving the welding rod 23 of the welding machine 13 and seam 12 relative to each other in close welding proximity to each other; as so shown, the welding rod 23 is stationary and the tube 11 is moved longitudinally relative thereto thereby forming a butt-weld of the seam 12. Simultaneously with the welding operation, the weld is backed up by a weld back-up member 14 positioned within the tube against the inside of the surface to be welded; as illustrated, the back-up member 14 is biased magnetically against the inside of the seam to be welded. The back-up member 14 is floated in the tube 11, being held under the electrode 23 against relative movement with respect to the welding machine 13 by a swimmer 40, thereby maintaining the back-up member 14 continuously against the surface which is being welded. The improved method of welding the tube will produce a welded butt joint having no inside bead as exemplified by the cross section of FIG. 5.

While there has been illustrated and described a particular embodiment of the present invention, it will be appreciated that numerous changes and modifications will occur to those skilled in the art, and it is intended in the appended claims to cover all those changes and modifications as fall within the true spirit and scope of the present invention.

What is claimed as new and is desired to be secured by Letters Patent of the United States is:

1. A welding apparatus for use in closing the seam in seamed tubing comprising means for continuously welding a tubular article as it is moved relative to said means, second means positioned within said tubular article and biased against the inner surface of said article to back up the weld during the welding operation, means including at least one magnet biasing said second named means by magnetic force against the inner surface of the article being welded, and means restraining said second named means from relative movement with respect to first named means.

2. A welding apparatus for use in closing the seam in seamed tubing comprising means for continuously butt-welding said seam as said tube is moved relative to said means, a back-up member positioned within said tube and biased against said seam along the inside surface of said tube to back up the weld of the welding operation, magnetic means biasing said member against said seam by the magnetic force between said member and said magnetic means, and restraining means restraining said member from movement with said tube whereby said back-up member is held stationary within said tube under said first named means.

3. A welding apparatus for use in closing the seam in seamed tubing comprising a continuous welding machine for continuously welding the seam of a tube as the tube is moved relative to the machine, a back-up member positioned within said tube against the seam being welded to back up the weld, at least one magnet biasing said member against said seam by the magnetic attraction between said member and said magnet, and a second member restraining said first member from movement relative to said machine whereby said second member is held stationary in said tube with respect to said welding machine.

4. A welding apparatus as defined in claim 3 above wherein said back-up member includes at least a portion formed of magnetically attractable material.

5. A welding apparatus as defined in claim 4 above wherein said back-up member also includes a hollow cylindrical back-up portion of refractory material secured to said first-mentioned portion.

6. A method of closing a seam in a continuous length of seamed tubing comprising moving a welding rod and the seam to be welded relative to each other in close welding proximity to each other, positioning a weld back-up member in said tube under the seam being welded adjacent the point of welding, restraining the back-up member from relative movement with respect to said welding machine, and magnetically biasing said back-up member against the seam to form a back-up for the weld.

7. A welding apparatus for use in closing the seam in continuous lengths of seamed tubing comprising means for continuously butt-welding said seam as said tube is moved relative to said means, a back-up member longitudinally positioned within said tube and stationary relative to said tube including at least a portion of magnetically attractive material and biased against said seam along the inside surface of said tube to back up the weld of the welding operation, means biasing said back-up member against said seam, and a wirelike member having one end connected to said back-up member and the other end fixedly secured relative to said first-mentioned means whereby said back-up member is held in a stationary position within said moving tube.

8. A welding apparatus as set forth in claim 7 above above wherein said biasing means comprises magnetic means.

9. A welding apparatus as set forth in claim 7 above wherein said portion of magnetically attractive material comprises an inner shaft, and wherein said back-up member additionally includes a cylindrical member secured concentrically to said shaft, and wherein said biasing means comprises a magnet positioned externally of said tube and magnetically attracting the shaft of magnetically attractive material within said tube.

References Cited in the file of this patent

UNITED STATES PATENTS

| | | |
|---|---|---|
| 1,381,647 | Knoll | June 14, 1921 |
| 1,886,524 | Chapman | Nov. 8, 1932 |